(12) United States Patent
Reynolds

(10) Patent No.: US 11,047,127 B2
(45) Date of Patent: Jun. 29, 2021

(54) BUILDING SKIRTING BASE

(71) Applicant: David T. Reynolds, Cedaredge, CO (US)

(72) Inventor: David T. Reynolds, Cedaredge, CO (US)

(*) Notice: Subject to any disclaimer, the term of this patent is extended or adjusted under 35 U.S.C. 154(b) by 0 days.

(21) Appl. No.: 16/192,222

(22) Filed: Nov. 15, 2018

(65) Prior Publication Data
US 2020/0157796 A1   May 21, 2020

(51) Int. Cl.
*E04B 1/343* (2006.01)
*E04F 13/08* (2006.01)
*B60P 3/32* (2006.01)

(52) U.S. Cl.
CPC ...... *E04B 1/34342* (2013.01); *E04B 1/34347* (2013.01); *E04B 1/34352* (2013.01); *E04F 13/0803* (2013.01); *B60P 3/32* (2013.01)

(58) Field of Classification Search
CPC ............ E04B 1/34352; E04B 1/34342; E04B 1/6154; E04F 13/0803; E04F 13/0801; E04F 13/0821; E04F 13/0823; Y10S 52/03
USPC ............. 52/169.12, DIG. 3, 800.15, 800.18, 52/800.17, 800.12
See application file for complete search history.

(56) References Cited

U.S. PATENT DOCUMENTS

| | | | | |
|---|---|---|---|---|
| 1,803,589 A * | 5/1931 | Bohnsack | ............... | E04B 2/825 52/241 |
| 3,865,358 A * | 2/1975 | Butters | ............... | F16F 1/44 267/140 |
| 4,242,848 A * | 1/1981 | Schoultz | ............... | A47B 95/043 52/717.06 |
| 5,644,878 A * | 7/1997 | Wehrmann | ............ | E04B 2/7457 52/235 |
| 5,907,933 A * | 6/1999 | Stanfill | ............... | E04B 1/34342 52/169.12 |
| 6,076,327 A * | 6/2000 | Hendrickson | ....... | E04B 1/34342 52/102 |
| 6,374,552 B1 * | 4/2002 | Price | ................... | E04B 1/34342 52/169.12 |
| 6,543,197 B2 * | 4/2003 | Wetzel, III | .......... | E04B 1/34315 52/581 |
| 6,588,165 B1 * | 7/2003 | Wright | .................... | E04F 19/06 52/459 |
| 7,207,147 B2 * | 4/2007 | Price | ........................ | E04B 2/06 52/574 |
| 7,685,781 B1 * | 3/2010 | Hatch | ................. | E04B 1/34342 52/169.12 |
| 8,646,237 B1 * | 2/2014 | Takagi | ................. | E04B 1/7629 52/464 |
| 9,540,804 B1 * | 1/2017 | Farahmandpour | .. | E04F 13/0807 |

(Continued)

*Primary Examiner* — Chi Q Nguyen
(74) *Attorney, Agent, or Firm* — Sheridan Ross P.C.

(57) ABSTRACT

A mobile home skirting base comprising: a horizontal surface; and two substantially equal, substantially symmetrical vertical surfaces co-extruded with the horizontal surface forming a channel to insert a mobile home skirting panel wherein the vertical surfaces each having an inwardly oriented retention edge that secure the mobile home skirting panel. The height of the vertical surfaces and the inward orientation of the vertical surfaces' retention edges, along with the other aspects of the invention, allows the mobile home skirting base to provide strong support, stabilization, and protection of the skirting panels.

20 Claims, 11 Drawing Sheets

(56) References Cited

U.S. PATENT DOCUMENTS

| | | | | |
|---|---|---|---|---|
| 10,787,817 B1* | 9/2020 | Bilge | .................. | E04F 13/0821 |
| 2007/0163187 A1* | 7/2007 | Price | ..................... | E02D 29/025 |
| | | | | 52/169.12 |
| 2007/0163203 A1* | 7/2007 | Price | ....................... | E02D 27/01 |
| | | | | 52/834 |
| 2007/0175114 A1* | 8/2007 | Price | ....................... | E02D 27/01 |
| | | | | 52/169.12 |
| 2016/0369496 A1* | 12/2016 | Farahmandpour | .. | E04F 13/0801 |

* cited by examiner

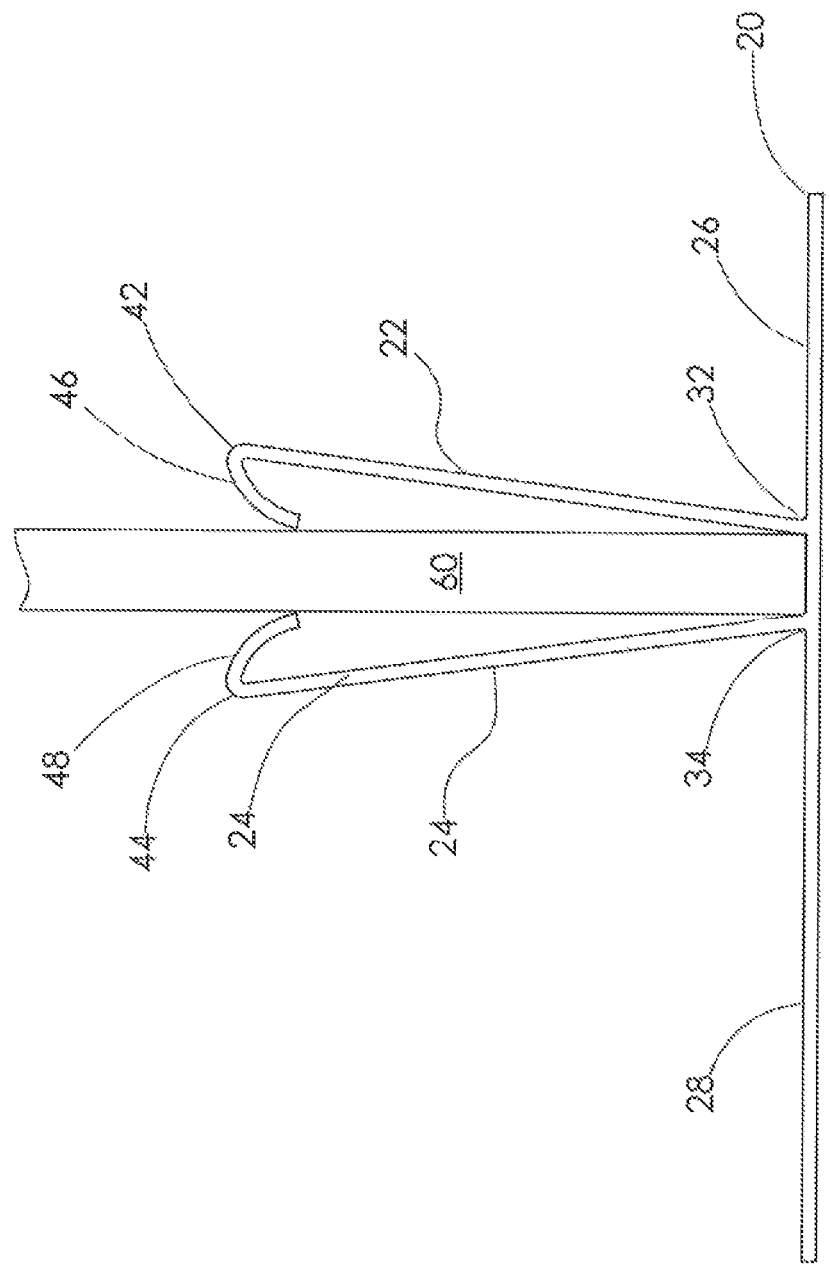

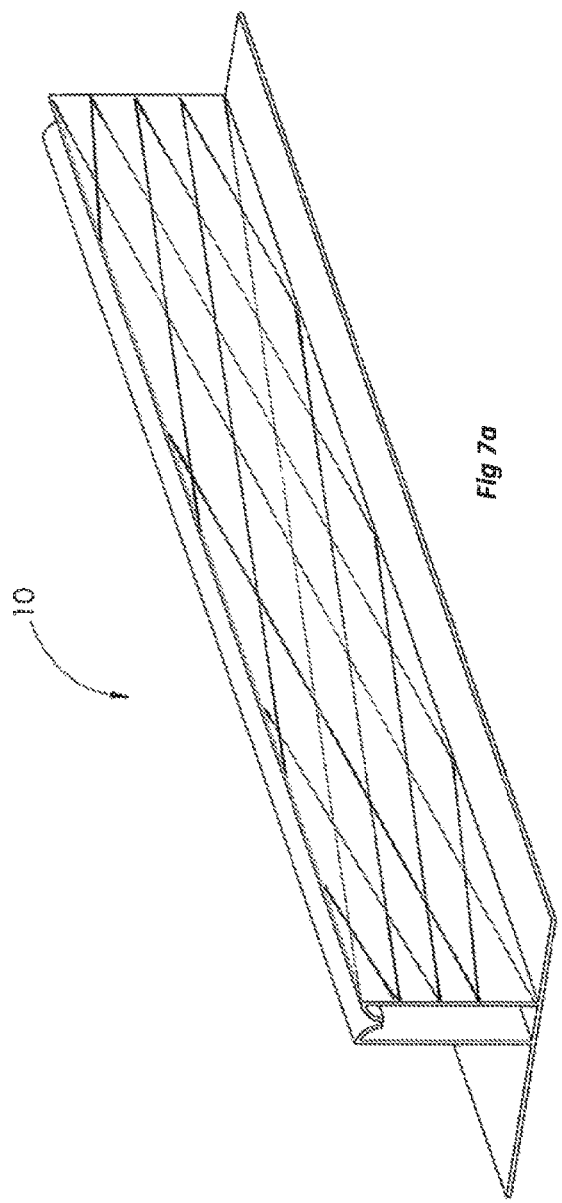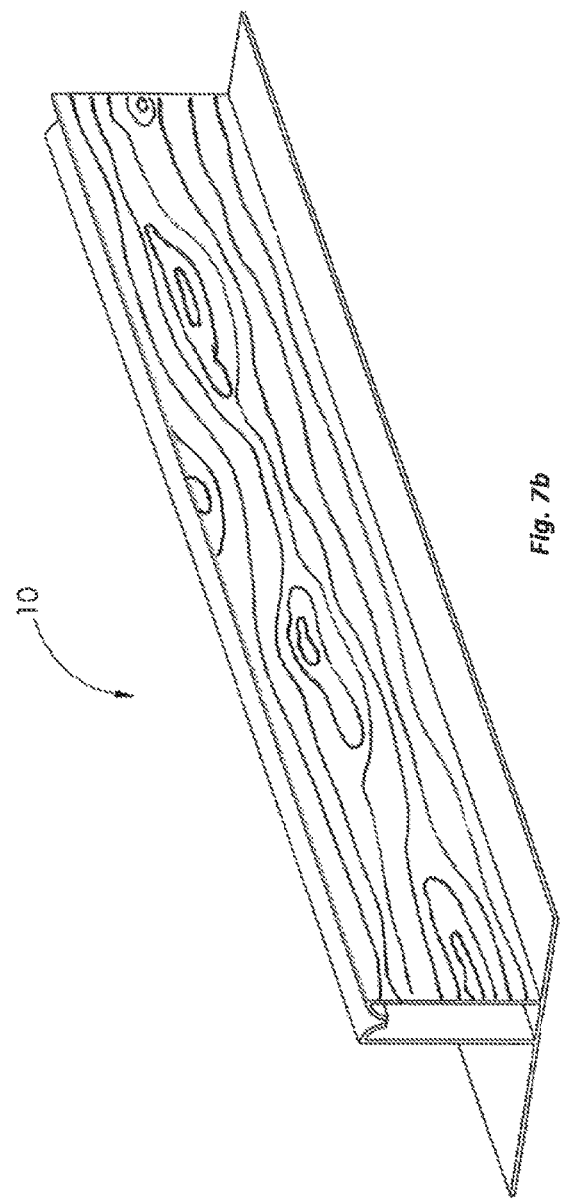

BUILDING SKIRTING BASE

FIELD OF INVENTION

The present disclosure relates generally to building skirting and more specifically to mobile building skirting bases.

BACKGROUND

Elevated buildings such as, for example, mobile homes, mobile buildings, or mobile offices (collectively referred to herein as "mobile homes") are often set on a base that is elevated above the ground. This elevated configuration lends to a less than pleasing aesthetic result given that the mobile home is often mounted on blocks leaving the under-framing, undercarriage, and/or one or more wheel axels exposed.

It is well known in the art that a series of vertical and/or horizontal panels, commonly known as skirting, can be used to cover the under-side of the mobile home and create a more aesthetically pleasing appearance. Skirting can take many forms and can be manufactured from many materials such as, for example, vinyl, wood, metal, polymer, or some combination thereof. Most often there is both a vertical and a horizontal component to skirting and a need to maintain the position of the skirting while having accessibility to the under-side of the mobile home.

To maintain the position of the skirting under the mobile home, often the vertical components, to which the horizontal components are attached, can be inserted into a base member attached at both the top of the skirting and the bottom of the skirting, wherein the vertical member is further secured by clips or screws to maintain structural integrity.

The purpose of the skirting base disclosed herein is to provide a skirting base that provides enhanced structural integrity and better functionality with a more uniform appearance.

SUMMARY

In accordance with the teachings disclosed herein, embodiments related to a mobile home skirting base are disclosed.

In an embodiment, the base comprises a first horizontal surface that can be attached to a substrate on which a mobile home is mounted at the end of said base's horizontal edge for additional structural stability. The base also comprises two substantially equal, substantially symmetrical vertical surfaces co-extruded with the horizontal surface, wherein each vertical surface has an inwardly oriented hook-shaped retention edge to provide a substantially rigid friction surface to retain vertical skirting supports and panels.

The base serves to hold vertical mobile home skirting panels in place, stabilize the panels from being displaced either laterally or vertically by natural elements including wind, and to protect the aesthetic quality of the vertical skirting panels by preventing said panels from getting scratched by natural elements or artificial elements including landscaping equipment.

As compared to other mobile home skirting bases in the prior art, the vertical surfaces co-extruded with the horizontal surface in this invention provide greater support, stabilization, and protection of the vertical skirting panels due primarily to three aspects of the mobile home skirting base that work in concert with each other to provide distinct and novel utility described in this invention. The first principal aspect of the invention is the substantially equal and substantially symmetrical nature of the base's vertical surfaces. The second principal aspect is the inwardly oriented hook-shaped retention edge of each vertical surface arising from the horizontal surface of the base. The third principal aspect is the vertical surfaces' relatively substantial height which each exceed the length of the horizontal surface of the base in one embodiment, and in another embodiment, and each vertical surface of the base exceeds half the length of the horizontal surface of the base.

BRIEF DESCRIPTION OF THE DRAWINGS

FIG. 5 is a cross-cut view of the mobile home skirting base including a vertical support according to aspects of the present invention.

FIG. 7a is a view of the mobile home skirting base according to aspects of the present invention showing a pattern embossed on the surface of a vertical member.

FIG. 7b is a view of the mobile home skirting base according to aspects of the present invention showing a natural wood pattern embossed on the surface of a vertical member.

DETAILED DESCRIPTION OF THE PREFERRED EMBODIMENTS

Figure 1:
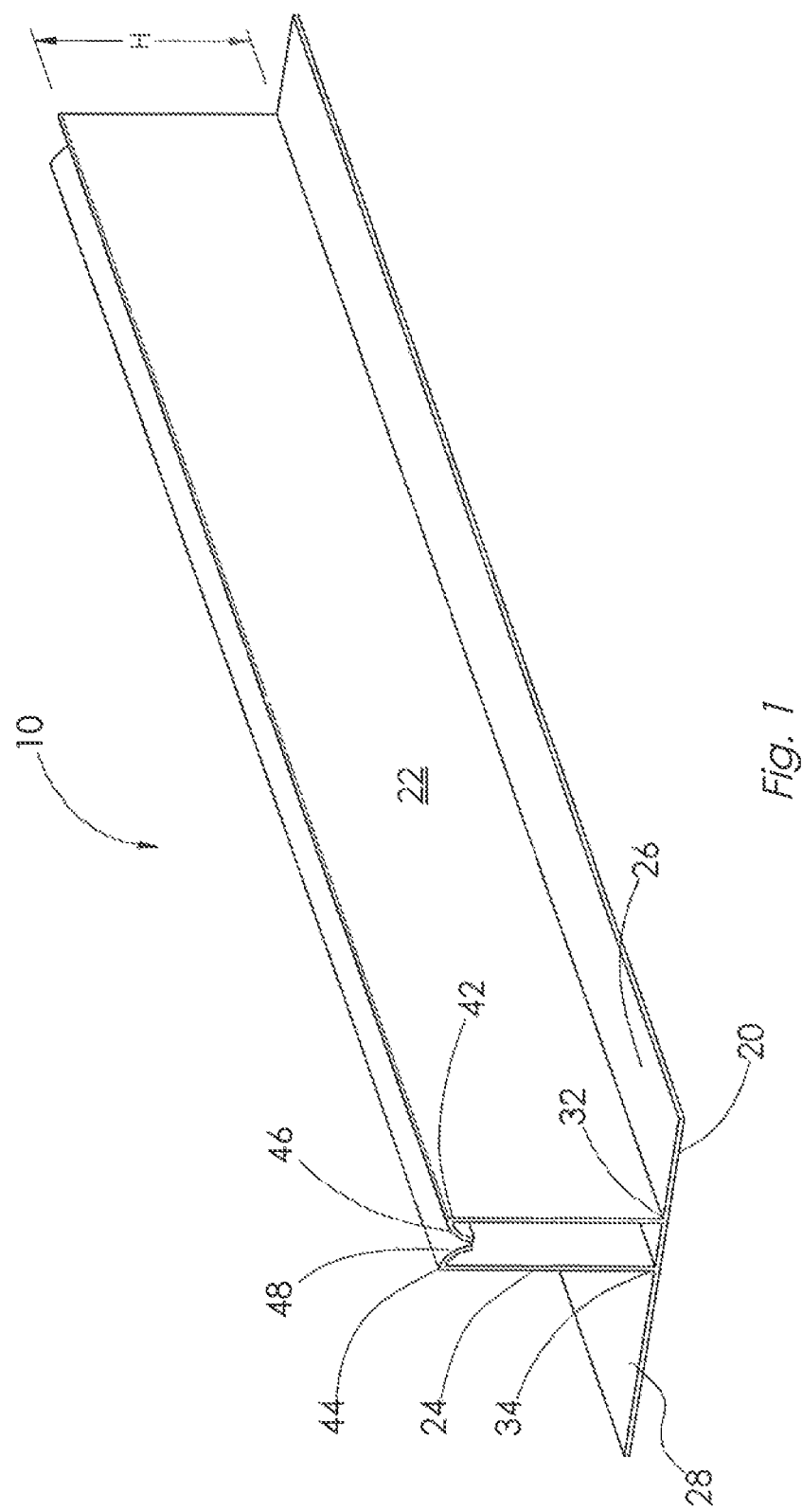
FIG. 1 is a perspective view of the mobile home skirting base according to aspects of the present invention.
Figure 2:
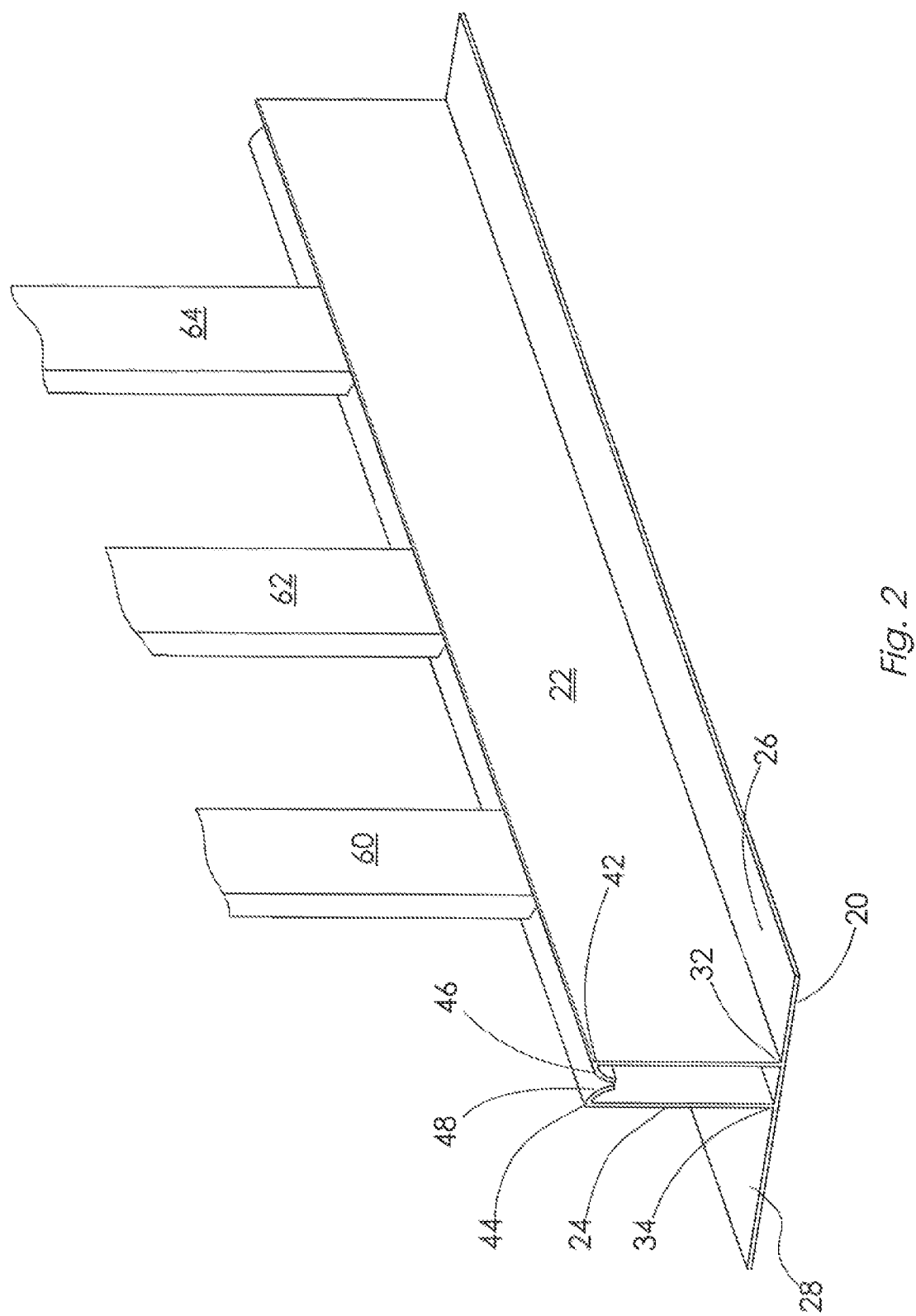
FIG. 2. is a perspective view of the mobile home skirting base including vertical supports according to aspects of the present invention
Figure 3:
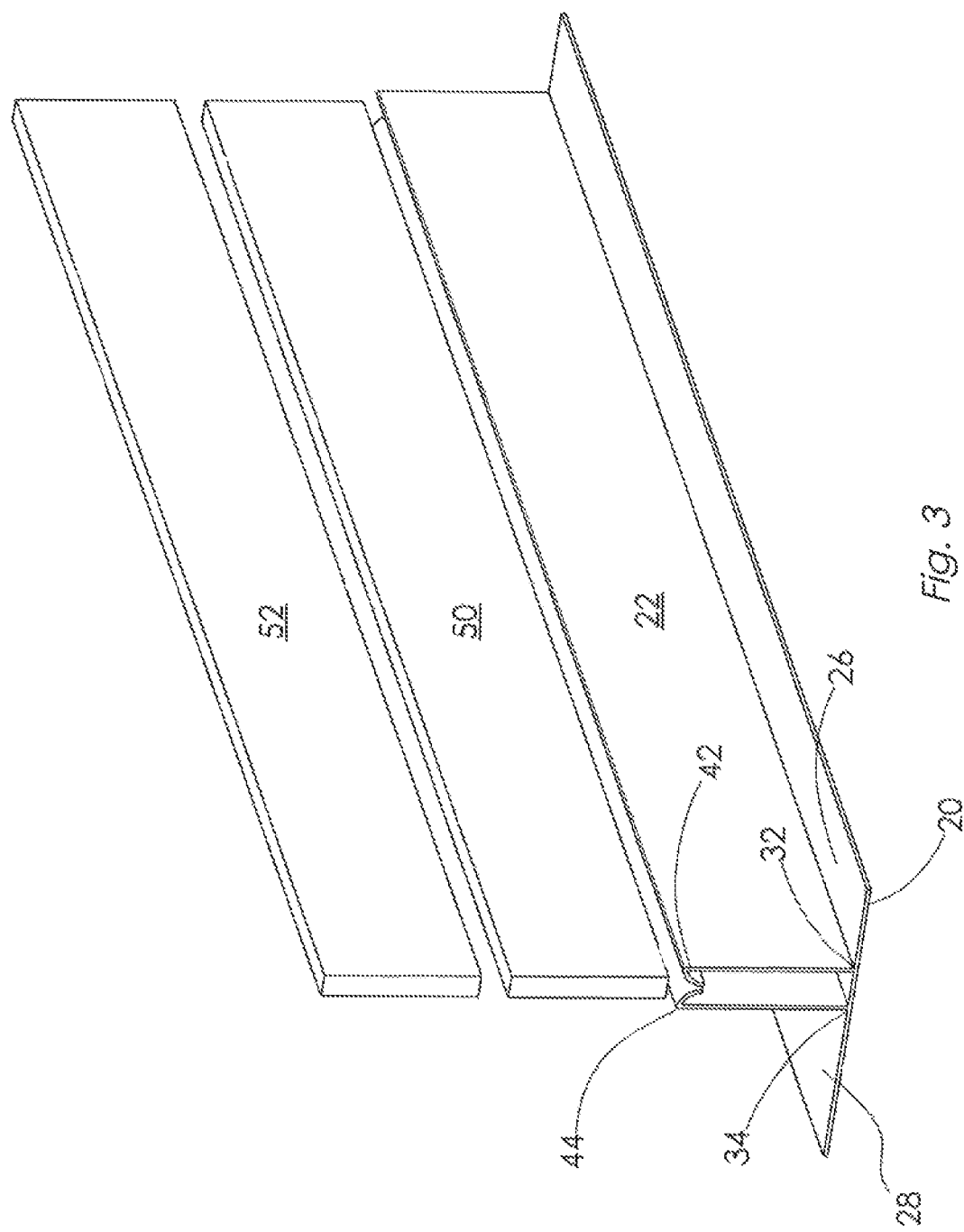
FIG. 3 is a perspective view of the mobile home skirting base including horizontal members according to aspects of the present invention.
Figure 4:
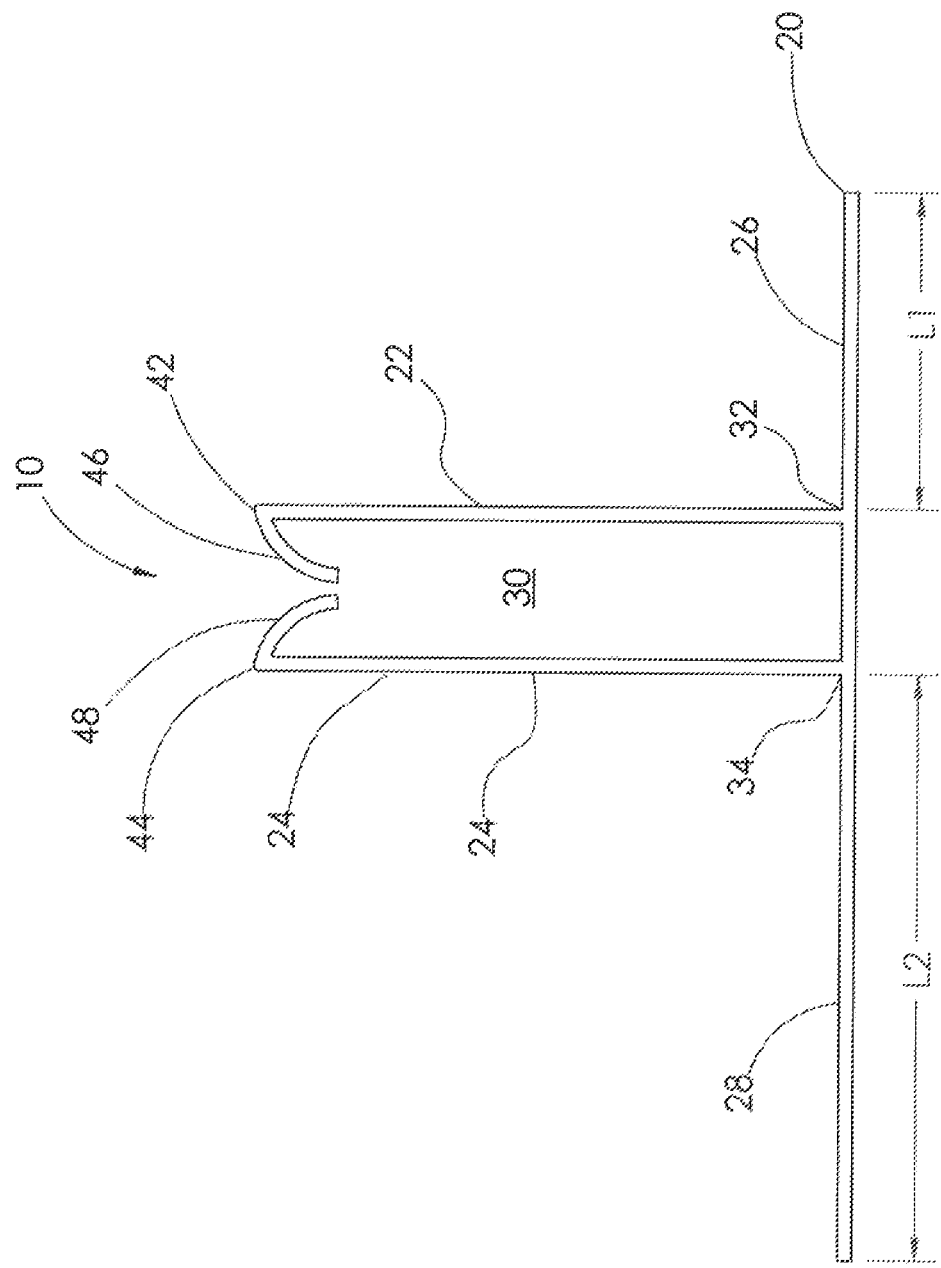
FIG. 4 is a cross-cut view of the mobile home skirting base according to aspects of the present invention.
Figure 6A:
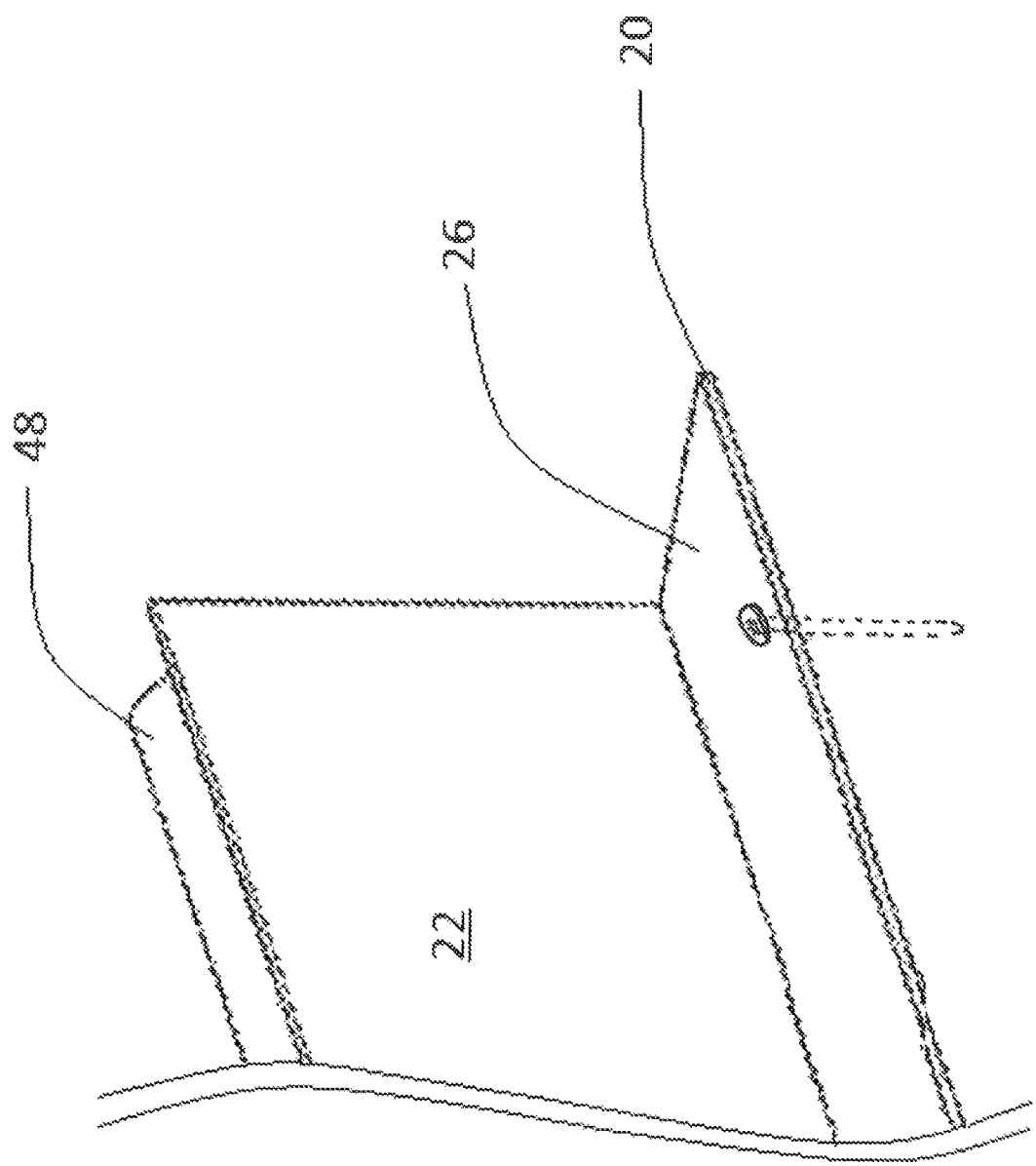
FIG. 6a is a truncated perspective view of the mobile home skirting base according to aspects of the present invention illustrating a nail as a mechanical attachment.
Figure 6B:
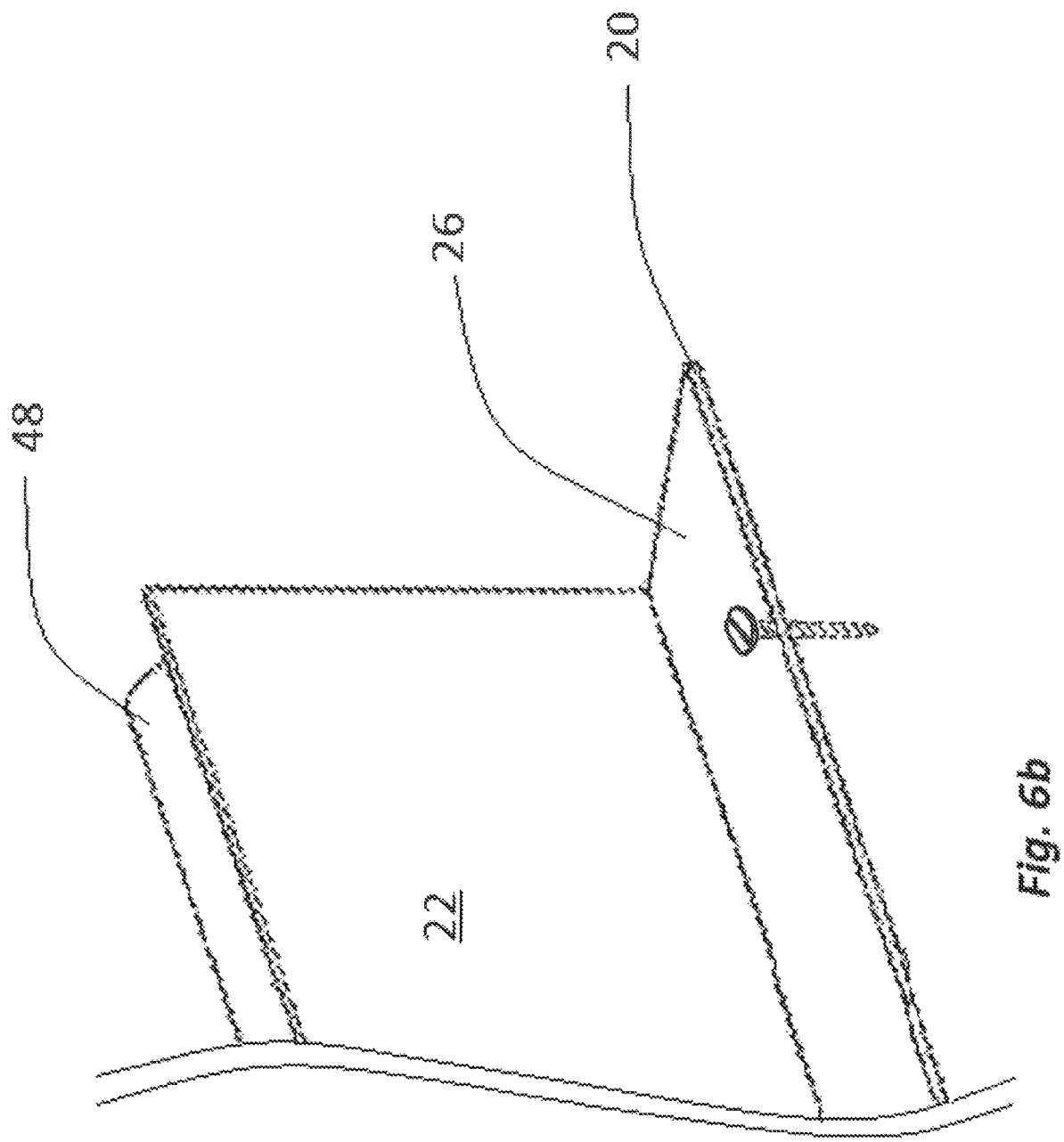
FIG. 6b is a truncated perspective view of the mobile home skirting base according to aspects of the present invention illustrating a screw as a mechanical attachment.
Figure 6C:
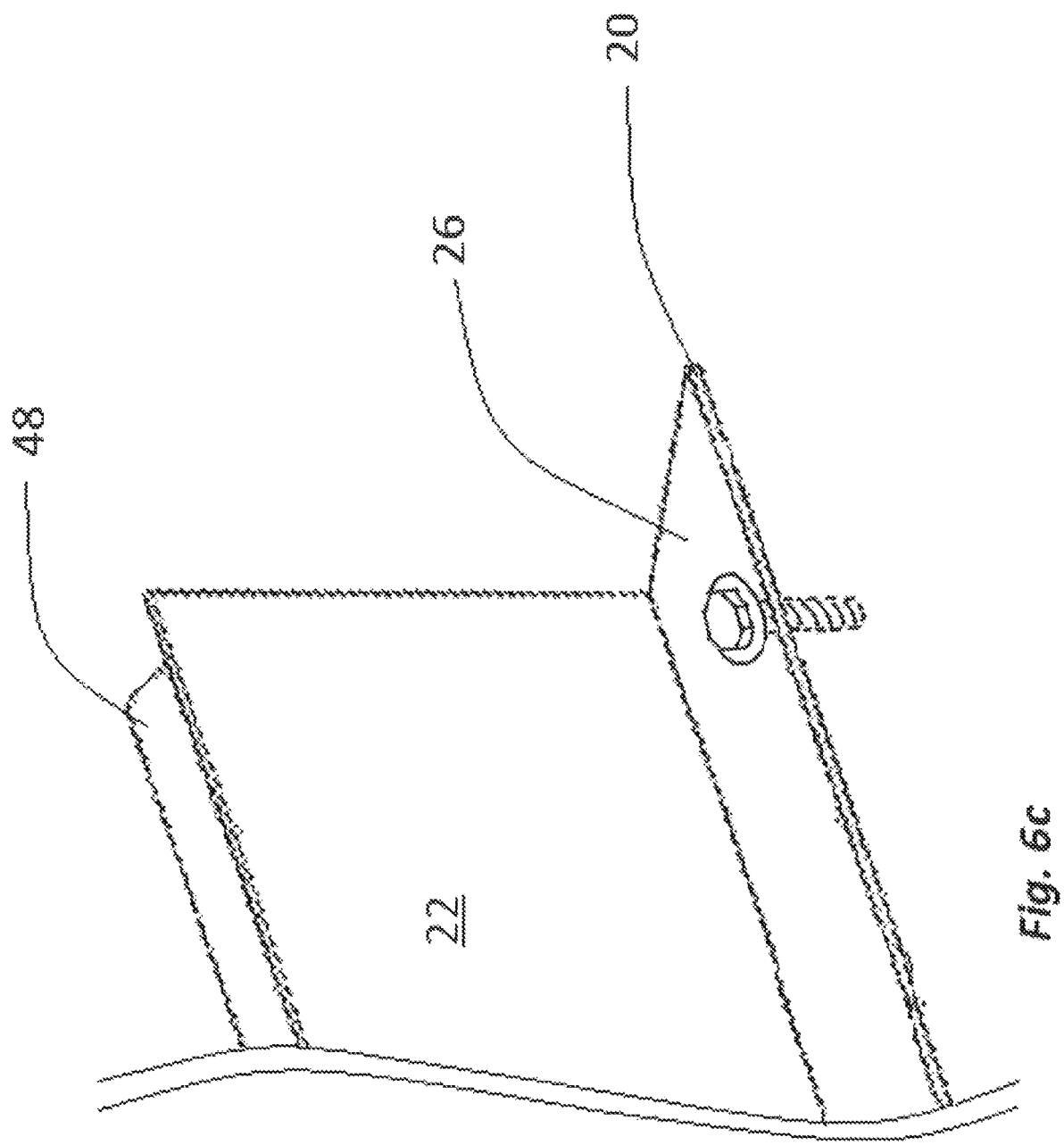
FIG. 6c is a truncated perspective view of the mobile home skirting base according to aspects of the present invention illustrating a bolt as a mechanical attachment.
Figure 6D:
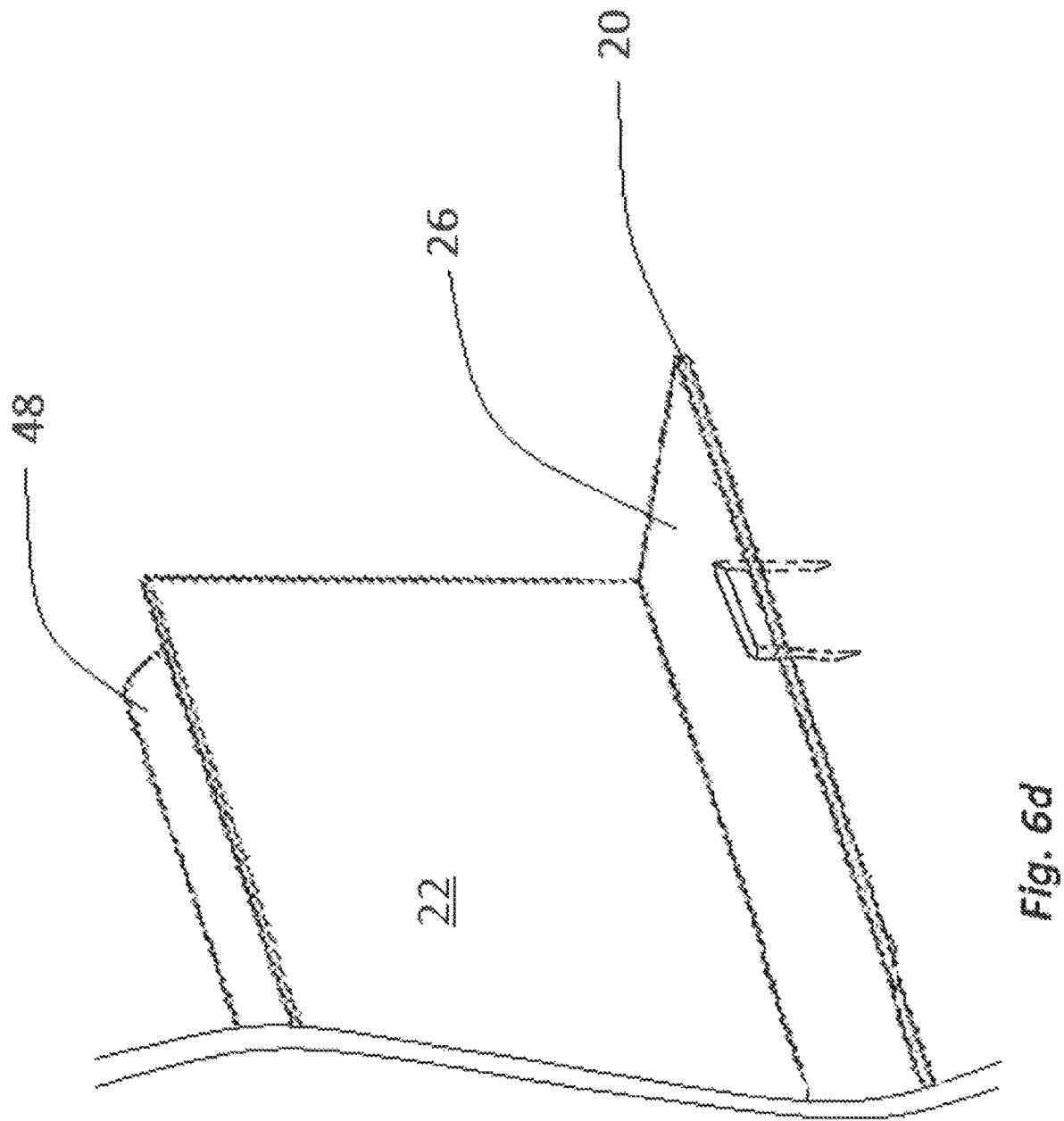
FIG. 6d is a truncated perspective view of the mobile home skirting base according to aspects of the present invention illustrating a staple as a mechanical attachment.
Figure 6E:
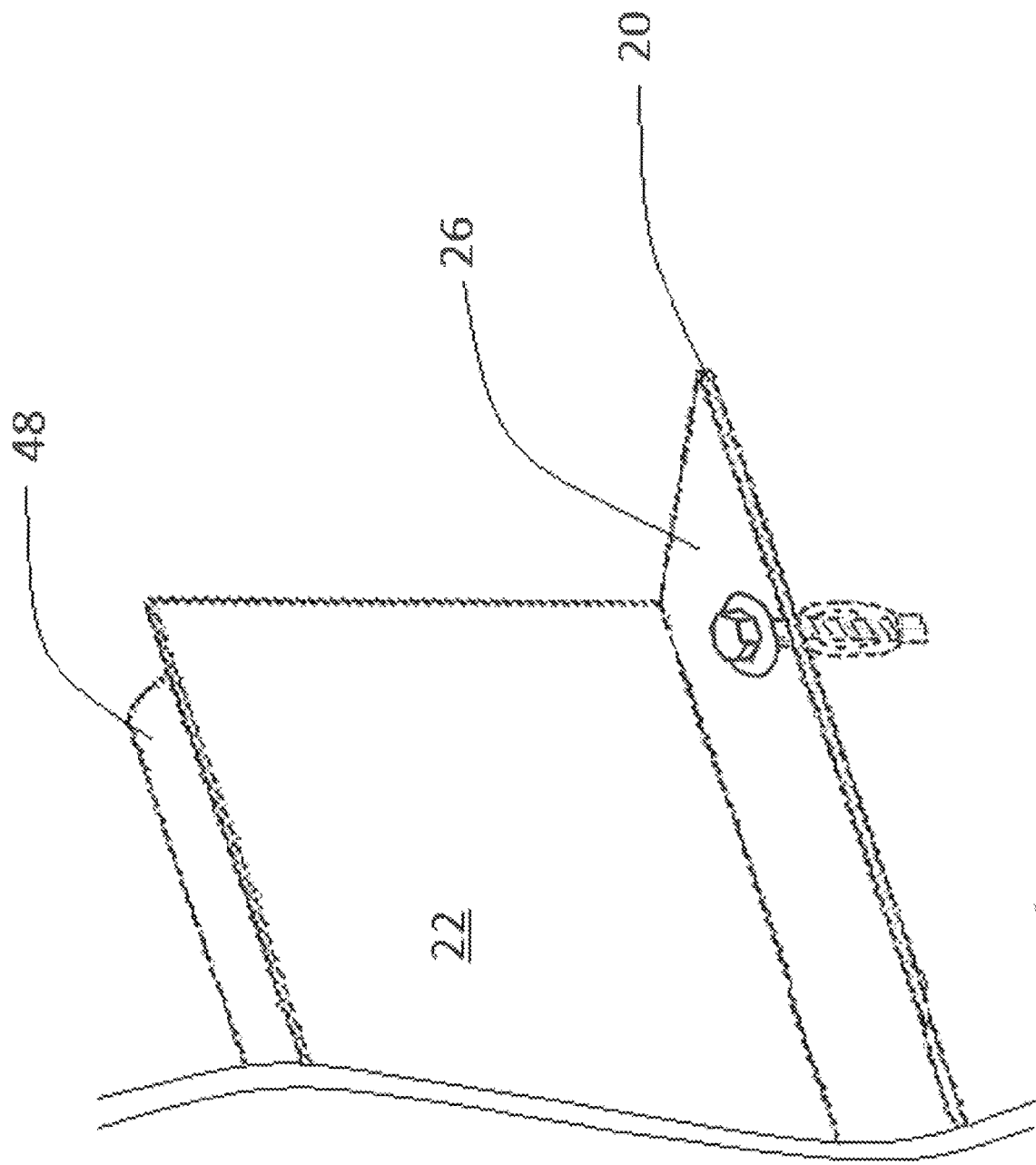
FIG. 6e is a truncated perspective view of the mobile home skirting base according to aspects of the present invention illustrating an anchor as a mechanical attachment.

A detailed description of the embodiments for a mobile home skirting base device will now be presented with reference to FIGS. 1 through 5. One of skill in the art will recognize that these embodiments are not intended to be limitations on the scope, and that modifications are possible without departing from the spirit thereof. In certain instances, well-known methods, procedures, components, and circuits have not been described in detail.

Referring now to FIGS. 1-5, a first embodiment of the invention is shown and generally referred to by reference numeral 10. The skirting base 10 comprises a horizontal surface 20 and a first vertical member 22 affixed to the horizontal surface 20 at a first end 32 of the first vertical member 22. The skirting base 10 further comprises a second vertical member 24 affixed to said horizontal surface 20 at a first end 34 of the second vertical member 22 opposite the first vertical member 22 thereby defining a channel 30 between the first vertical member 22 and second vertical member 24.

According to aspects of the present invention, the height of the first vertical member 22 and the second vertical member 24 are substantially similar. In addition, the dimension of the height (H) of the first vertical member 22 and the second vertical member 24 is substantially similar to the horizontal members of the mobile home skirting 50, 52 to provide a more uniform appearance of the skirting in general.

On a second end 42 of the first vertical member 22, a hook-shaped retention edge 46 is inwardly oriented toward the channel 30 at an acute angle to provide a substantially rigid friction surface to retain vertical skirting supports and panels 60, 62, 64.

On a second end 44 of the second vertical member 24, a hook-shaped retention edge 48 is inwardly oriented toward the channel 30 at an acute angle to provide a substantially rigid friction surface to retain vertical skirting supports and panels 60, 62, 64.

The hook-shaped retention edges 46, 48 of the vertical members 22, 24 secure vertical skirting supports 60, 62, 64 through direct physical pressure and friction rather than by mechanical means, such as for example, a screw. Although, mechanical means may be utilized to provide additional structural integrity.

The skirting base 10 provides strong support, stabilization, and protection of the vertical skirting supports 60, 62, 64 because the retention edges 46, 48 are hook shaped, inward facing, and in close proximity to one other. Moreover, substantially similar height of the vertical members 22, 24 provide additional friction by the resistance that each retention edge 46, 48 places in the direction of the other retention edge 48, 46.

The height (H) of the first vertical member 22 and second vertical member 24 differs from prior art skirt bases inasmuch as prior art skirt bases have opposing vertical members that are not the substantially similar in size, do not have inward facing retention edges, and are not substantially similar in size to the height of the horizontal skirting members 50, 52.

The horizontal surface 20 of the skirt base 10 can comprise a first lip 26 adjacent the first vertical member 22 and a second lip 28 adjacent the second vertical member 24, each extending outward from the channel to provide sufficient material to enhance the stability of the skirt base 10 or to allow for physical connection of the to a substrate. The length (L1) of the first lip 26 and the length (L2) of the second lip 28, can vary depending on the particular need or application.

As contemplated herein, the length (L1) of the first lip 26 and the length (L2) of the second lip 28 are no less than 20% of the height (H) of the vertical members 22, 24. This results in base 10 having a first lip 26 and a second lip 28 approximately 3 or 4 times larger than existing solutions. The result is additional stability due to the increased contact with the substrate.

An additional benefit from the increase in the size of the first lip 26 and a second lip 28, is that the longer lip surfaces assist in preventing vegetation, such as grass, weeds, or plants from growing immediately adjacent the vertical surface of the skirting assembly and allows lawn maintenance implements, such as lawn mowers, edgers, weed eaters, and the like to be used near the skirting assembly without having to be too close to the skirting assembly and possibly causing accidental damage.

The skirting base 10 can be affixed to a substrate by mechanical means such as nails, screws, bolts, anchors and the like. The skirting base 10 can also be affixed to a substrate by chemical means such as glue, cement, adhesive, epoxy or any combination thereof. The skirting base 10 can be used as a support on both the bottom of a skirting assembly (not shown) and at the top of a skirting assembly (not shown).

The increased and substantially similar height of the vertical members 22, 24 of the skirting base 10 not only provide a better bite by way of the inward facing retention edges, but allow for maintenance in and around the skirting, such as, for example, weed-eating and other landscaping activities that may otherwise cause displacement of a vertical skirting support upon contact due to lowered or asymmetrical vertical member heights.

In alternate embodiments, the mobile home skirting base can be alternatively configured for differing needs. By way of example, the length (L1) of the first lip 26 and the length (L2) of the second lip 28 can be identical or the length (L1) of the first lip 26 can be greater than the length (L2) of the second lip 28.

In additional embodiments, the skirting base 10 and skirting assembly can be configured to operate as an aesthetic repair for previously installed and damaged skirting.

The skirting base 10 can be manufactured from vinyl wood, metal, fiberglass, polymer, or any combination thereof. The skirting base 10 can be molded, folded, milled, welded, extruded or any combination thereof. In addition, one or more of the vertical members 22, 24 of the skirting base 10 can be embossed with a design or pattern, such as, for example, a pattern that emulates natural wood. According to aspects of the present invention, extrusion of polymer material is the preferred method of manufacture

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A mobile home skirting system comprising:
a horizontal surface
a first vertical member affixed to said horizontal surface along a first edge of the first vertical member;
a second vertical member affixed to said horizontal surface along a first edge of the second vertical member opposite the first vertical member thereby defining a channel between the first and second vertical members, wherein the horizontal surface extends outward from both sides of the channel to provide sufficient material for connection to a substrate and wherein the horizontal surface, the first vertical member and the second vertical member define a base;
a first hook-shaped retention edge on a second edge of the first vertical member inwardly oriented toward the channel; and
a second hook-shaped retention edge on a second edge of the second vertical member inwardly oriented toward the channel, wherein the height of the first vertical member and the second vertical member are substantially similar and wherein the first and second hooked shaped retention edges are configured to secure a vertical skirting panel through direct physical pressure exerted by said first and second vertical members.

2. The mobile home skirting system of claim 1 comprises a materials selected from the group consisting of: wood; metal; fiberglass; and a polymer.

3. The mobile home skirting system of claim 1, wherein said base comprises extruded material.

4. The mobile home skirting system of claim 1 wherein said base is attached to a substrate by one of mechanical attachment or chemical attachment.

5. The mobile home skirting system of claim 4 wherein said mechanical attachment is selected from the group consisting of: nails; screws; bolts; staples; and anchors.

6. The mobile home skirting system of claim 4 wherein said chemical attachment is selected from the group consisting of: glue, cement, and epoxy.

7. The mobile home skirting system of claim 1 wherein said base supports both a bottom and a top of the skirting system.

8. The mobile home skirting system of claim 1 wherein one or more of the vertical members comprises an embossed design or pattern.

9. The mobile home skirting system of claim 8 wherein the embossed pattern emulates natural wood.

10. A mobile home skirting system comprising:
    a horizontal surface;
    a first vertical member affixed to said horizontal surface along a first edge of the first vertical member;
    a second vertical member affixed to said horizontal surface along a first edge of the second vertical member opposite the first vertical member thereby defining a channel between the first and second vertical members, wherein the horizontal surface extends outward from both sides of the channel to provide sufficient material for connection to a substrate and wherein the horizontal surface, the first vertical member and the second vertical member define a base;
    a first hook-shaped retention edge on a second edge of the first vertical member inwardly oriented toward the channel; and
    a second hook-shaped retention edge on a second edge of the second vertical member inwardly oriented toward the channel, wherein the height of the first vertical member and the second vertical member are substantially similar, wherein the first and second hooked shaped retention edges are configured to secure a vertical skirting panel through direct physical pressure exerted by said first and second vertical members and wherein the mobile home skirting base comprises a single extruded polymer.

11. The mobile home skirting system of claim 10 wherein said base is attached to a substrate by one of mechanical attachment or chemical attachment.

12. The mobile home skirting system of claim 11 wherein said mechanical attachment is selected from the group consisting of: nails; screws; bolts; staples; and anchors.

13. The mobile home skirting system of claim 10 wherein said chemical attachment is selected from the group consisting of: glue, cement, and epoxy.

14. The mobile home skirting system of claim 10 wherein said base supports both a bottom and a top of the skirting system.

15. The mobile home skirting system of claim 10 wherein one or more of the vertical members comprises an embossed design or pattern.

16. The mobile home skirting system of claim 15 wherein the embossed pattern emulates natural wood.

17. A mobile home skirting system comprising:
    a horizontal surface;
    a first vertical member affixed to said horizontal surface along a first edge of the first vertical member;
    a second vertical member affixed to said horizontal surface along a first edge of the second vertical member opposite the first vertical member thereby defining a channel between the first and second vertical members, wherein the horizontal surface extends outward from both sides of the channel to provide sufficient material for connection to a substrate and wherein the horizontal surface, the first vertical member and the second vertical member define a base;
    a first hook-shaped retention edge on a second edge of the first vertical member inwardly oriented toward the channel; and
    a second hook-shaped retention edge on a second edge of the second vertical member inwardly oriented toward the channel, wherein the height of the first vertical member and the second vertical member are substantially similar, wherein the first and second hooked shaped retention edges are configured to secure a vertical skirting panel through direct physical pressure exerted by said first and second vertical members, wherein the mobile home skirting base comprises a single extruded polymer; and wherein one or more of the vertical members comprises an embossed design or pattern.

18. A mobile home skirting system, comprising:
    a base comprising a first horizontal surface adapted to be attached to a substrate on which a mobile home rests, said base including a first vertical member and a second vertical member, wherein a channel is defined between the first vertical member and second vertical member, the first and second vertical members being substantially equal in height and having inwardly oriented hook-shaped retention edges forming an acute angle toward the channel and that each have a substantially rigid friction surface adapted to retain a vertical skirting panel; said first and second vertical members having a vertical height that is substantially similar to horizontal members of the mobile home skirting system, wherein the hook-shaped retention edges of the first and second vertical members are adapted to secure a vertical skirting panel through direct physical pressure exerted by said first and second vertical members.

19. The mobile home skirting system as set forth in claim 18, wherein the horizontal surface of the skirt base comprises a first lip adjacent the first vertical member and a second lip adjacent the second vertical member, each extending outward from the channel.

20. The mobile home skirting system as set forth in claim 18, wherein a length of the first lip and a length of the second lip are no less than 20% of the height of the vertical members.

* * * * *